Feb. 12, 1946.  E. Q. CAMP ET AL  2,394,662
REMOVAL OF ORGANIC ACIDS FROM CRACKED NAPHTHA
Filed Sept. 25, 1942
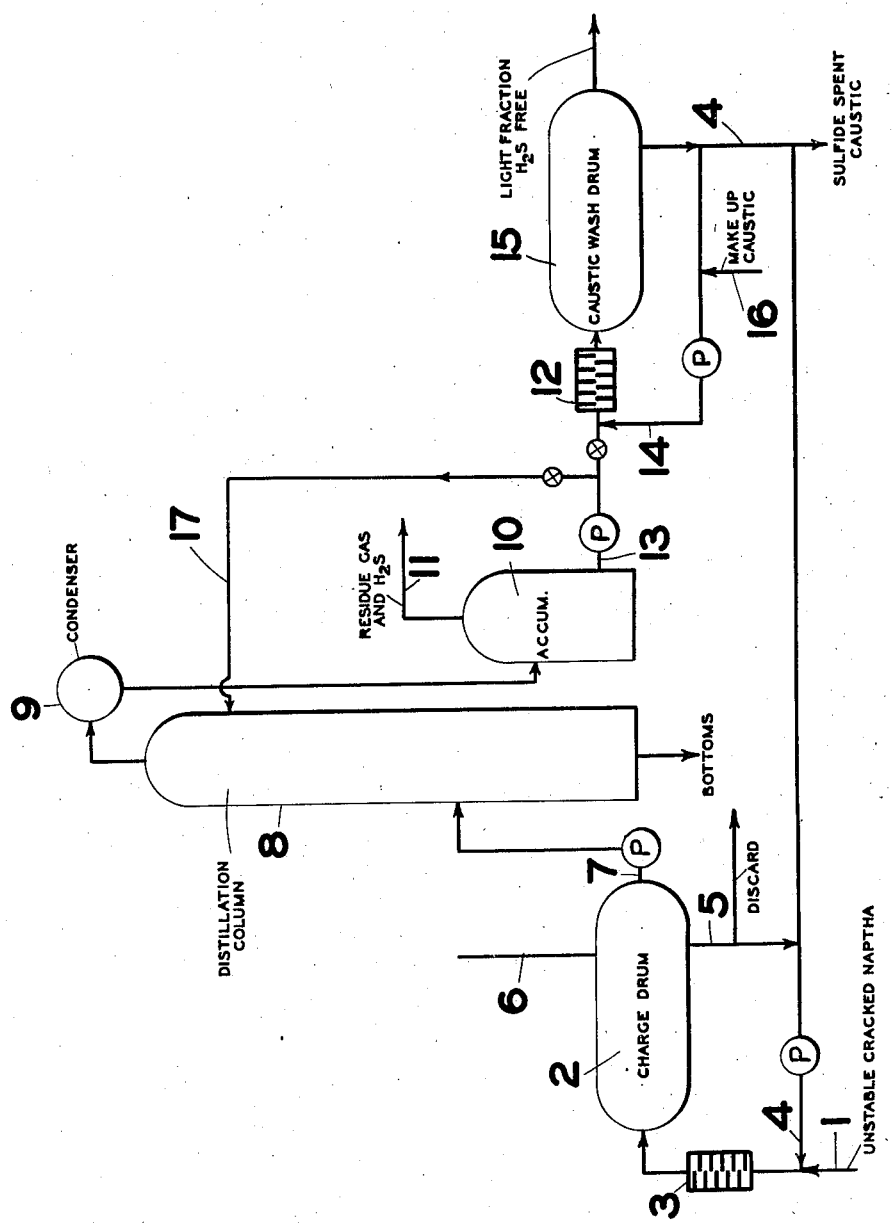
INVENTORS:
ELZA Q. CAMP AND
DAVID C. WALSH, JR.
BY P. J. Whelan
ATTORNEY Patented Feb. 12, 1946

2,394,662

UNITED STATES PATENT OFFICE 2,394,662

REMOVAL OF ORGANIC ACIDS FROM CRACKED NAPHTHA

Elza Q. Camp, Goose Creek, and David C. Walsh, Jr., Wooster, Tex., assignors to Standard Oil Development Company, a corporation of Delaware Application September 25, 1942, Serial No. 459,646

2 Claims. (Cl. 196—32)

The present invention is directed to the treatment of cracked naphtha to prevent corrosion of the processing equipment.

Cracked naphtha contains combined sulphur which, during subsequent distillation, is given off as hydrogen sulfide. It is necessary to remove this hydrogen sulfide from the overhead from the still. This is customarily done by scrubbing the overhead with caustic after it is condensed.

It has been found that the cracked naphtha also contains certain acids, such as acetic, propionic, etc., which cause considerable corrosion of the distillation equipment unless they are removed. It has been suggested to remove these corrosive acids by washing the feed stock to the still with water.

According to the present invention the steps of removing hydrogen sulfide and corrosive acids are combined in such a way as to secure maximum utilization of the caustic and maximum purification of the hydrocarbons from acids in an economical manner. Briefly, the invention resides in washing the feed stock to the distillation equipment with the caustic which has been spent in removing sulfur from the overhead from the distillation equipment. Since the acids to be removed are stronger than hydrogen sulfide, the fact that the caustic has been spent in removal of hydrogen sulfide from the overhead fractions does not interfere with its efficiency in the removal of the organic acids.

One advantage of the present invention over prior practice resides in the fact that, when water is used to extract organic acids from petroleum naphthas, large volumes of water are required and it is necessary to allow the naphtha to remain in intimate contact with the water for a considerable length of time. In the present invention only short contact times and relatively small quantities of the spent caustic solutions are required for substantially complete removal of the organic acids. In the practice of the removal of organic acids from petroleum naphtha as has been carried out prior to the present invention when water was used to remove the organic acids therefrom, it was necessary, for complete removal of the organic acids, to finally subject the naphtha to a caustic wash. It is obvious to one skilled in the art that utilization of spent caustic solution enables the organic acids to be removed completely in one treating operation.

The present invention will be more clearly understood from the following detailed description of the accompanying drawing, in which the single figure is a front elevation, in diagrammatic form of one arrangement embodying the present invention.

Referring to the drawing in detail, numeral 1 designates a feed line to the distillation equipment which empties into a charge drum 2 after passing through an incorporator 3. Ahead of the incorporator the feed line is joined by a line 4 which delivers spent caustic. The mixture, after emptying into drum 2, separates into layers, of which the lower one is caustic, and is withdrawn through line 5. Line 5 may be joined to line 4 for recycling purposes if desired. The charge drum is provided with a vent pipe 6 for the escape of hydrogen sulfide. The hydrocarbon layer is withdrawn from drum 2 through line 7 and fed into a distillation column 8 from the top of which there is recovered an overhead which is condensed in a condenser 9 and stored in an accumulator, which also has a vent pipe 11 for residual gases. The condensate is conducted to an incorporator 12 by a line 13. Ahead of the incorporator there is a branch line 14 which delivers fresh caustic to be mixed with the condensate in the incorporator 12, from which the mixture is discharged into a settling drum 15, from the bottom of which spent caustic is withdrawn through line 4. Line 14 may be connected to line 4 for recycling purposes, and is provided with a branch line 16 for the introduction of fresh caustic.

Ahead of its junction point with line 14, line 13 is provided with a branch line 17, which serves the purpose of returning reflux to the distillation column 8.

The aforedescribed procedure makes possible the maximum purification of the naphtha for a given amount of caustic consumption with the minimum of operating losses due to corrosion troubles. If water is used to wash out the low molecular weight acids, the naphtha must ultimately be washed with caustic to remove acids of higher molecular weight. By using the spent caustic from the overhead wash all the acids are eliminated from the charge stock to distillation equipment. It seems likely also that some of the mercaptans are removed in this washing step, whereby decreasing the caustic requirements for the overhead wash.

In one particular operation according to the embodiment described with relation to the figure, prior to installation of the present invention, heat exchange equipment used in conjunction with the distillation tower 8 required repairs approximately every two weeks due to failure of the equipment by corrosion of the metal surfaces by the organic acids contained in the petroleum being processed.

After installation of the present invention the heat exchange apparatus was used for over five months without any failure or shutting down of equipment for repairs due to corrosion thereof. By the practice of the present invention it was possible to increase the operating time without shutting down more than ten-fold over what was possible heretofore.

While this invention has been described by reference to a particular embodiment in which the spent caustic, resulting from removing $H_2S$ from the overhead fraction of a cracked naphtha is utilized in treating the feed naphtha for removal of organic acids, it is evident that spent caustic resulting from other treating operations may be utilized with equal success. For example, it may be desirable to treat virgin naphthas with caustic solutions for removal of $H_2S$ therefrom and then to accumulate and store this solution for treatment of cracked naphtha for removal of organic acids. It is also apparent that these organic acids can be removed by washing the total cracked naphtha, the naphtha between any one or all intermediate fractions, or an overhead fraction prior to a subsequent distillation with aqueous caustic solutions of any strength spent during the removal of hydrogen sulfide from naphtha. Conversely, the alkaline reagent may be spent with regard to removal of $H_2S$ or an acid of equivalent or less strength from a petroleum distillate.

The nature and objects of the present invention having been thus described and illustrated, what is claimed as new and useful and is desired to be secured by Letters Patent is:

1. The method of processing cracked naphtha which comprises feeding the naphtha to distillation equipment, recovering an overhead fraction from said equipment, scrubbing said fraction with caustic for the removal therefrom of sulphur compounds, and contacting the caustic spent in this operation with the feed stock to the distillation equipment for the removal from the latter of corrosive constituents.

2. A method according to claim 1 in which hydrogen sulfide is removed from the feed stock after it is mixed with the spent caustic and before it is introduced into the distillation equipment.

ELZA Q. CAMP.
DAVID C. WALSH, Jr.